United States Patent
Gouin et al.

(10) Patent No.: US 12,189,176 B2
(45) Date of Patent: Jan. 7, 2025

(54) PHOTOBLEACHING OF FIBER BRAGG GRATINGS WRITTEN THROUGH THE FIBER COATING

(71) Applicant: TERAXION INC., Quebec (CA)

(72) Inventors: Samuel Gouin, Quebec (CA); Claude Carignan, Quebec (CA); Mathieu Faucher, Quebec (CA); François Trepanier, Quebec (CA); Guy Rousseau, Quebec (CA); Martin Bernier, Quebec (CA); Alain Villeneuve, Mont-Royal (CA)

(73) Assignee: TERAXION INC., Quebec (CA)

( * ) Notice: Subject to any disclaimer, the term of this patent is extended or adjusted under 35 U.S.C. 154(b) by 516 days.

(21) Appl. No.: 17/502,997

(22) Filed: Oct. 15, 2021

(65) Prior Publication Data
US 2022/0120964 A1   Apr. 21, 2022

Related U.S. Application Data

(60) Provisional application No. 63/092,787, filed on Oct. 16, 2020.

(30) Foreign Application Priority Data

Jan. 29, 2021   (CA) ..................... 3107452

(51) Int. Cl.
*G02B 6/02* (2006.01)
*C03C 25/622* (2018.01)

(52) U.S. Cl.
CPC ........ *G02B 6/02138* (2013.01); *C03C 25/622* (2013.01); *G02B 2006/02161* (2013.01)

(58) Field of Classification Search
None
See application file for complete search history.

(56) References Cited

U.S. PATENT DOCUMENTS 10,132,994 B2   11/2018   Bernier et al.
2015/0160409 A1*   6/2015   Lai .................... G02B 6/02147
                                                          264/1.27
2020/0088936 A1*   3/2020   Lindner ............ G02B 6/02133

FOREIGN PATENT DOCUMENTS

JP   2002071974 A   *  3/2002

OTHER PUBLICATIONS

JP2002071974_A Clarivate Analytics Machine Translation retrieved Jun. 1, 2024. (Year: 2024).*

(Continued)

*Primary Examiner* — Lisa L Herring
(74) *Attorney, Agent, or Firm* — LOZA & LOZA, LLP; Michael F. Fedrick (57) ABSTRACT

A method and a system for providing a low absorption Bragg grating along a grating region of an optical fiber are presented. The Bragg grating is written along the grating region by multiphoton absorption of ultrafast light pulses impinged on this grating region through a polymer coating of the optical fiber. The Bragg grating is then photobleached by propagating a photobleaching light beam along the optical fiber. The photobleaching light beam has optical parameters selected to reduce defects in the grating region induced by the writing of the Bragg grating in a substantially non-thermal regime.

13 Claims, 6 Drawing Sheets

(56) References Cited

OTHER PUBLICATIONS

Dekker et al., âAnnealing dynamics of waveguide Bragg gratings: evidence of femtosecond laser induced colour centresâ, Optics Express, vol. 18, No. 4, pp. 3274-3283, Feb. 2010. (Year: 2010).*
C.G. Askins et al., Photodarkening and Photobleaching in Fiber Optic Bragg Gratings. Journal of Lightwave Technology, vol. 15, No. 8, pp. 1363-1370 (1997).
Leich, Martin et al., In situ FBG inscription during fiber laser operation. Optics Letters, vol. 38, No. 5, pp. 676-678 (2013).
Fiebrandt, Julia et al., UV-induced photodarkening and photobleaching in UV-femtosecond-pulse-written fibre Bragg gratings. Laser Physics Letters, vol. 10, 085102 (6 pages) (2013).
Girard, S. et al., Radiation Effects on Silica-Based Optical Fibers: Recent Advances and Future Challenges. IEEE Transactions on Nuclear Science, vol. 60, No. 3, pp. 2015-2036 (2013).
Gusarov, Andrei et al., Radiation Effects on Fiber Gratings. IEEE Transactions on Nuclear Science, vol. 60, No. 3, pp. 2037-2053 (2013).
Krämer, Ria G et al., Extremely robust femtosecond written fiber Bragg gratings for an ytterbium-doped fiber oscillator with 5 kW output power. Optics Letters, vol. 45, No. 6, pp. 1447-1450 (2020).

* cited by examiner

PHOTOBLEACHING OF FIBER BRAGG GRATINGS WRITTEN THROUGH THE FIBER COATING

CROSS-REFERENCE TO RELATED APPLICATIONS

This application claims the benefit of priority under 35 U.S.C. § 119(e) from U.S. Patent Application No. 63/092,787, filed on Oct. 16, 2020, and under 35 U.S.C. § 119(a) from Canadian Patent Application No. 3,107,452, filed on Jan. 29, 2021. The disclosures of the foregoing applications are incorporated herein by reference in their entirety.

TECHNICAL FIELD

The technical field generally relates to the manufacture of Fiber Bragg gratings and more particularly concerns a post processing step in the FBG writing method involving photobleaching of the grating using visible light.

BACKGROUND

Fiber Bragg gratings (FBGs) are typically fabricated by impinging a patterned laser beam on the core of a host optical fiber. The writing laser beam is generally an ultraviolet (UV) continuous wave (CW) or Q-switched long nanosecond or microsecond pulsed laser, diffracted by a phase mask to produce the desired diffraction pattern. Since the process is based on single photon absorption, it usually requires that the fiber be sensitized to the UV light by changing or adapting its composition (photosensitive fiber), or by temporary doping the fiber with hydrogen (H), deuterium (D) or hydrogen-deuterium (HD). This latter process, which requires long exposure to high temperature and high pressure of H or D or HD, can be hazardous. The writing process is usually confined to the core of the fiber and can only be controlled with difficulty, if at all, over the fiber cross-section.

Typical FBG fabrication techniques also require the removal of the original polymer jacket surrounding the host optical fiber around the grating area, typically a low index fluoroacrylate, and recoating of the fiber once the grating has been inscribed. The removal of the polymer jacket can limit the performance and reliability of the resulting fiber, as is for example the case for double-clad type optical fibers used in high power fiber lasers. Furthermore, the process of removing the jacket can degrade the mechanical integrity of the fiber itself. The subsequent recoating of the fiber is typically of inferior quality compared to the original coating that was applied during the fiber drawing process.

An attractive alternative to the traditional UV writing process is the inscription of Bragg gratings in optical fiber using ultrashort pulses, that is, in the femtosecond pulse duration range. It has been demonstrated that the writing of FBGs in non-photosensitized silica fiber was possible through a non-resonant process using the multiphoton absorption of ultrashort infrared pulses. Furthermore, BERNIER et al (U.S. Pat. No. 10,132,994) disclose a writing through the coating (WTC) process and demonstrated that this approach can be adapted to circumvent the necessity of removing the polymer jacket of the fiber. This approach can be particularly useful in the context of high power fiber lasers, for which there is a need for writing FBGs through the polymer jacket. A second need is to control the transverse profile of the FBG. Writing with femtosecond visible or near-IR femtosecond pulses satisfies both of these needs. Femtosecond writing of FBGs uses a multiphoton process, and thus is highly dependent on intensity, which implies that the index change of the FBG writing process occurs only near the focus of the writing beam.

In order to maintain the optical performance of the Bragg grating over its lifetime, and prevent the early deterioration of the grating when exposed to high optical power, FBGs are usually subjected to thermal annealing or aging after their inscription. This step is usually carried out after writing but before recoating the fiber, as the annealing or aging process is usually done by heating the FBG above the temperature that would damage the polymer jacket. As a result, this step can be incompatible with WTC writing processes.

There remains therefore a need for methods to manufacture FBGs that alleviates at least some of the above-mentioned drawbacks.

SUMMARY

In accordance with one aspect, there is provided a method for providing a low absorption Bragg grating along a grating region of an optical fiber, comprising:
a) writing the Bragg grating along the grating region by multiphoton absorption of ultrafast light pulses impinged on said grating region, said ultrafast light pulses also inducing defects in the grating region; and
b) photobleaching the Bragg grating by propagating a photobleaching light beam along the optical fiber, the photobleaching light beam interacting with the grating region so as to reduce the defects induced by the ultrafast light pulses in a substantially non-thermal regime.

In some implementations, a temperature in the grating region of the fiber during interaction of the photobleaching light beam therewith is below a thermal annealing threshold.

In some implementations, the photobleaching light beam has a spectral profile including wavelengths within a non-thermal light absorption range of the optical fiber. The spectral profile of the photobleaching light beam may be composed of said wavelengths within a non-thermal light absorption range of the optical fiber. The non-thermal light absorption may range consists of a wavelength range between about 400 nm and 700 nm. In some implementations, the method according to claim 3, wherein the spectral profile of the photobleaching light beam comprises wavelength around 600 nm.

In some implementations, the photobleaching light beam has an optical power within the grating region between about 1 W and 25 W.

In some implementations, the propagating of the photobleaching light beam in the optical fiber is performed for an exposure time between 1 second and 500 hours.

In some implementations, the propagating of the photobleaching light beam in the optical fiber is performed for a sequence of time periods each associated with a different optical power level.

In some implementations, the photobleaching of the Bragg grating is performed subsequently to the writing of the Bragg grating. In other variants, the photobleaching of the Bragg grating is performed concurrently to the writing of the Bragg grating.

In some implementations, the writing of Bragg grating is performed through a polymer coating of the optical fiber.

In some implementations, the method further comprises thermally annealing the Bragg grating prior to said photobleaching thereof.

In some implementations, the method further comprises maintaining the optical fiber suspended in air during the photobleaching of the Bragg grating.

In accordance with another aspect, there is provided an optical fiber having a low absorption Bragg grating provided therealong according to the method above or any variant thereof.

In accordance with yet another aspect, there is provided a system for providing a low absorption Bragg grating along a grating region of an optical fiber, including:
- a light generator generating a writing light beam of ultrafast optical pulses;
- an optical assembly configured to impinge the ultrafast light pulses on the grating region of the optical fiber to write the Bragg grating along said grating region by multiphoton absorption of the ultrafast light pulses while also inducing defects in the grating region;
- a photobleaching light source for photobleaching the Bragg grating by propagating a photobleaching light beam along the optical fiber, the photobleaching light beam interacting with the grating region so as to reduce the defects induced by the ultrafast light pulses in a substantially non-thermal regime.

In some implementations, the system further includes a phase mask disposed between the light generator and the optical fiber.

In some implementations, the optical assembly is further configured to impinge the ultrafast optical pulses on the grating region through a polymer coating of said optical fiber.

In some implementations, the photobleaching light beam has optical parameters jointly selected such that a temperature in the grating region of the fiber during interaction of the photobleaching light beam therewith is below a thermal annealing threshold. The optical parameters may include a spectral profile, an exposure time and an optical power of the photobleaching light beam impinging on the grating region. In some implementations, the spectral profile of the photobleaching light beam includes or is composed of wavelengths within a non-thermal light absorption range of the optical fiber. In some implementations, the non-thermal light absorption range consists of a wavelength range between about 400 nm and 700 nm. In some implementations, the optical power of the photobleaching light beam within the grating region is between about 1 W and 25 W. In some implementations, the exposure time of the photobleaching light beam in the optical fiber is between about 1 second and 500 hours.

Other features and advantages of the invention will be better understood upon reading of embodiments thereof with reference to the appended drawings.

DETAILED DESCRIPTION

The present description generally relates to methods and systems for writing a low absorption Bragg grating along a grating region of an optical fiber through a polymer coating of the optical fiber, and to the resulting FBGs.

Optical fibers are typically composed of a light guiding core and one or more cladding surrounding the core. A protective polymer coating surrounds the outermost cladding. Embodiments of the method described herein may be used with a variety of optical fiber types. The core and cladding of the optical fiber may be made of glass such as silica or any type of oxide glass, and may be made of pure glass or may be doped with one or more dopants. Advantageously, the fiber need not be made of a photosensitive material or be photosensitized prior to the writing of a Bragg grating therein. As such, co-doping the fiber with germanium, as is known in the art to enhance photosensitivity, is not required, although in some embodiments the fiber may be germanium-doped and hydrogen- or deuterium-loaded to enhanced photosensitivity without departing from the scope of the invention.

In some embodiments, the optical fiber may alternatively be made of a crystalline material such as a sapphire, germanium, zinc selenide, yttrium aluminium garnet (YAG) or other crystalline materials with similar physical properties.

In other embodiments, the optical fiber may alternatively be made of low phonon energy glass such as a fluoride, chalcogenide or chalcohalide glass or other glass materials with similar physical properties. The low phonon energy glass medium can be of a variety of compositions, such as, but not limited to, doped or undoped fluoride glasses such as ZBLA, ZBLAN, ZBLALi, chalcogenide glasses such as $As_2S_3$ or $As_2Se_3$ or chalcohalide glasses.

In some embodiments, the core and/or the cladding of the optical fiber can be doped with one or more rare-earth element such as ytterbium, erbium, holmium, thulium, praseodymium, neodymium, dysprosium, etc., or combinations thereof. The optical fiber may also include other dopants such as aluminum, phosphorus, etc.

The polymer coating, sometimes referred to as the fiber jacket or fiber coating, may be made of any suitable polymer or hybrid polymer material. For example, standard optical fibers for telecommunication or fiber lasers are typically provided with an acrylate or fluoroacrylate-based coating. In other embodiments, the polymer coating may be made of a polyimide, a silicone, a polytetrafluoroethylene (e.g. Teflon™), an organically modified ceramic (e.g. Ormocer™) and the like. In some cases, a thin layer of a hermetic material, such as carbon or metal, can be present at the polymer-to-cladding interface without departing from the scope of the invention.

Throughout the present description, the expression "Bragg grating" is understood to refer to any periodic or aperiodic refractive index pattern permanently provided in the optical fiber. It will be understood by one skilled in the art that the Bragg grating may be single or multi-channel, and may be chirped, slanted, sampled, or involve more than one such characteristics. The Bragg grating reflects light at one or more target wavelengths, that is, the wavelength or wavelengths which require filtering by the Bragg grating in its predestined application. For example, in telecommunication applications Bragg gratings may be used to filter light at a particular wavelength from a WDM (Wavelength Division Multiplexing) signal. In the context of fiber lasers, Bragg gratings can be used as one or both reflectors of the laser cavity, and the target wavelength then corresponds to the wavelength of the laser beam building in the laser cavity. In optical sensor applications, Bragg gratings can serve as temperature or strain sensing mechanisms, since such parameters affect the refractive index of the optical fiber, which in turn affects the wavelength of light being reflected or transmitted by a Bragg grating in this optical fiber. One skilled in the art will readily understand that the expression "target wavelength", even used in the singular, is no meant to be limited to monochromatic light and may refer to a more complex spectral profile reflected or transmitted by the Bragg grating.

Figure 1:
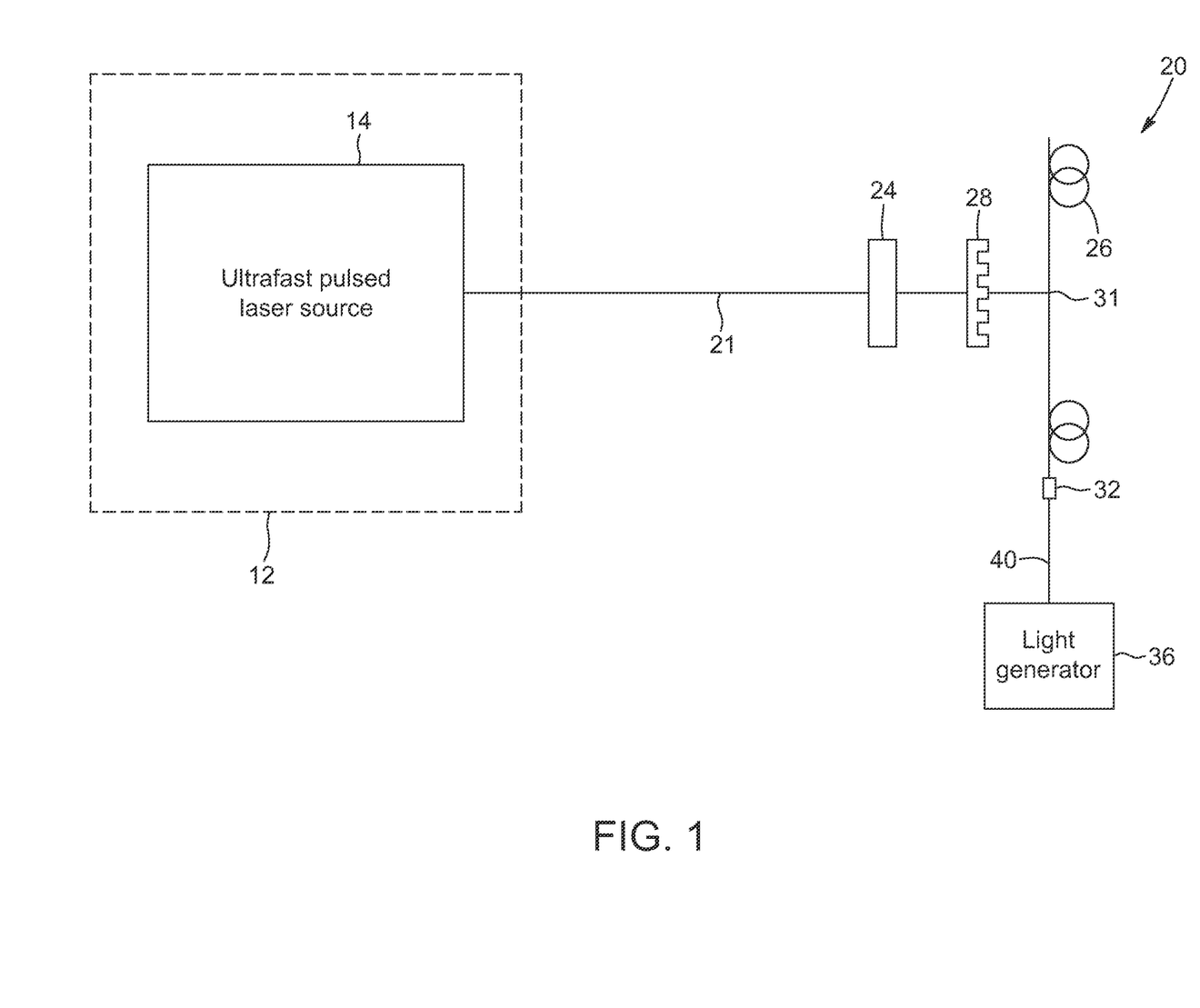
FIG. 1 is a schematic representation of a system for writing a Bragg grating in an optical fiber according to one embodiment, viewed along a length of the optical fiber.

One skilled in the art will also readily understand that Bragg gratings can be written according to embodiments of the invention using a variety of experimental set-ups or systems. Referring to FIG. 1, there is shown an example of an optical system 10 which may be used to perform the method according to embodiments of the invention. It will however be understood that this set-up is provided by way of example only and that the method described herein may be realized using different optical configurations without departing from the scope of protection.

The method according to embodiments of the invention involves writing the Bragg grating along the grating region 31 by multiphoton absorption of ultrafast light pulses 21 impinged on the grating region 31 through a polymer coating of the optical fiber 26. In one implementation, the system 10 includes a light generator 12 configured to generate a writing light beam of ultrafast optical pulses 21. The light generator 12 may be embodied by or include a femtosecond laser source 14. Of course, the light generator 12 may include additional optical components such as mirrors, lenses and the like.

By "ultrafast", it is understood that the duration of the optical pulses is in the femtosecond range, preferably between 1 femtosecond and 2 picoseconds, or between 10 and 1000 femtoseconds, or between 20 and 100 femtoseconds. The repetition rate of these optical pulses may for example be set between 1 Hz and 10000 Hz, or between 1 kHz and 5 kHz. As one skilled in the art will readily understand, at low repetition rate, for example less than 1 Hz, the writing process requires a longer exposure time to reach a target reflectivity of the Bragg grating, which may lead to mechanical instabilities and therefore limit the growth of the grating. The use of a high repetition rate (i.e. above 250 kHz) enables a shorter exposure time to reach the same target reflectivity but may also lead to a local detrimental effect from heat build-up that would limit the grating growth. The repetition rate of the optical pulses is therefore preferably set to an appropriate value within the range above in order to avoid the detrimental effects of both extremes. It will however be understood that this range is given by way of information only and that different implementations may involve different repetition rates without departing from the scope of the invention.

The selection of the writing wavelength of the optical pulses, that is, their wavelength when they reach the fiber, preferably takes under consideration the optical properties of the optical fiber. It will be readily understood that the polymer coating should be substantially transparent at the writing wavelength in order to enable the WTC process. The writing wavelength should furthermore be suitable to affect the core and/or cladding of the optical fiber in order to write the grating in the grating region. It is known in the art that ultrafast light pulses in a glass material can lead to a permanent refractive index change in the material through glass densification. The non-linear interaction of the ultrafast light pulses with the glass matrix can also lead to defects such as the formation of color centers or the formation of damaged micro-structures, which may contribute to the change in the refractive index but also may lead to absorption and/or diffusion losses. It will be readily understood that one or more of these phenomena may be present in various embodiments of the method described herein without departing from the scope of the present invention. The writing wavelength is chosen so that both the polymer coating and the glass matrix are transparent in the linear regime to minimize thermal effects during inscription, and allow inscription deep into the glass matrix at the beam focus where the intensity will be large enough to generate the multiphoton (non-linear) effect. By way of example, for acrylate and fluoroacrylate coatings, a wavelength above 400 nm is preferable, and even more preferably above 500 nm. A polyimide coating, which is yellow, typically requires a writing wavelength above 600 m ideally. Writing wavelengths of 800 nm and above are likely to be appropriate for most materials.

The energy of the femtosecond pulses is preferably selected to provide the desired intensity in the glass material of the optical fiber, that is energy by duration by surface area (typically measured in W/cm$^2$). In some implementations, the pulse energy maybe of the order of a nanoJoule, a microJoule or a milliJoule.

In one example, the light generator 12 may be or include a Ti-sapphire laser 14 emitting the light beam of optical pulses 21 at about 800 nm and of pulse duration of 35 fs, with an energy per pulse of the order of 200 μJ. Operating the same laser to emit pulses of a duration in the rage of 30 to 50 fs (repetition rate of 1 to 5 kHz) can provide from 150 to 300 μJ per impulsion. In another example, the light generator 12 may be or include an ytterbium-doped fiber laser 14 emitting the light beam of optical pulses 21 at about 1045 nm and of pulse duration of 250 fs. The ultrafast optical pulses 21 may alternatively result from the nonlinear conversion of the aforementioned laser sources through second or higher harmonic generation or optical parametric processes. For example converting 800 nm pulses into 400 nm pulses can provide 50-200 μJ per pulse of 50-100 fs duration, 1 to 5 kHz repetition rate. 1040 nm pulses can also be converted into 520 nm pulses.

Still referring to FIG. 1, the system 20 further include a phase mask 28, disposed between the light generator 12 and the optical fiber 26 It will be readily understood that the expression "phase mask" refers to a surface-relief structure forming corrugations in a material transmitting radiation at the writing wavelength. The corrugations define a diffraction grating having parameters selected such that the ultrafast optical pulses 21 are diffracted by the phase mask to form the interference pattern defining the Bragg grating within the grating region 31 of the fiber 26. The phase mask 28 may for example be made of silica and may be fabricated according to any appropriate technique as well known in the art. Examples of phase mask fabrication techniques can for example be found in U.S. Pat. No. 6,833,954 (ZWEIBACK et al) entitled "Lithographic method for manufacturing a mask used in the fabrication of a Fiber Bragg Grating", the entire contents of which being incorporated herein by reference.

The phase mask 28 is characterised by a pitch corresponding to the period of its corrugations. The pitch of the phase mask is selected according to the target wavelength of the FBG. To obtain a Bragg grating resonance at a design target wavelength $\lambda_B$, the periodic modulation of the effective refractive index in the grating region of the optical fiber must respect the phase-matching condition given by:

$$\frac{2 \cdot n \cdot \pi}{\Lambda} = 2 \cdot \frac{2\pi \cdot n_{\mathit{eff}}}{\lambda_B} \quad (1)$$

where $n_{\mathit{eff}}$ is the effective refractive index of the medium of the grating region, $\Lambda$ is the period of the interference pattern at the grating region and n=1, 2, 3 . . . is the diffraction order. By simplification, we obtain:

$$\lambda_B = 2 \cdot n_{\mathit{eff}} \cdot \frac{\Lambda}{n} \quad (2)$$

The design wavelength $\lambda_B$ corresponds to the fundamental Bragg resonance for n=1. In some embodiments, the phase mask has a pitch providing the fundamental Bragg resonance as the target wavelength. Advantageously, such embodiments provide an optimal diffraction efficiency, that is, the grating coupling coefficient, (and therefore its reflectivity) is maximal for a given refractive index modulation. In other embodiments, the pitch of the phase mask may be selected to provide a high order resonance (n=2, 3, . . . ) at the target wavelength of the Bragg grating.

The interference pattern obtained through diffraction of the ultrafast optical pulses by the phase mask and impinged on the grating region of the optical fiber results in a modification of the refractive index of the glass in a permanent fashion, as explained above, therefore providing the desired Bragg grating. Preferably, the optical pulses are focused on a region in and/or around the fiber core, in order to partially or totally cover the propagating mode to be reflected. However, in some implementations the grating region of the fiber in which the Bragg grating is written can be any suitable portion of the core of the fiber, its cladding or both. In some implementations the methods and systems described herein may provide for the writing of a very localized grating, which can be precisely located within the fiber.

In some implementations, the system 20 may include focusing component 24 or focusing assembly provided in a path of the light beam 21 and focusing the light beam 21 onto the core of the optical fiber. As well known in the art, the focusing component may be mounted on a translation stage to move the focus of the writing beam light beam over the optical fiber.

Figure 1A:
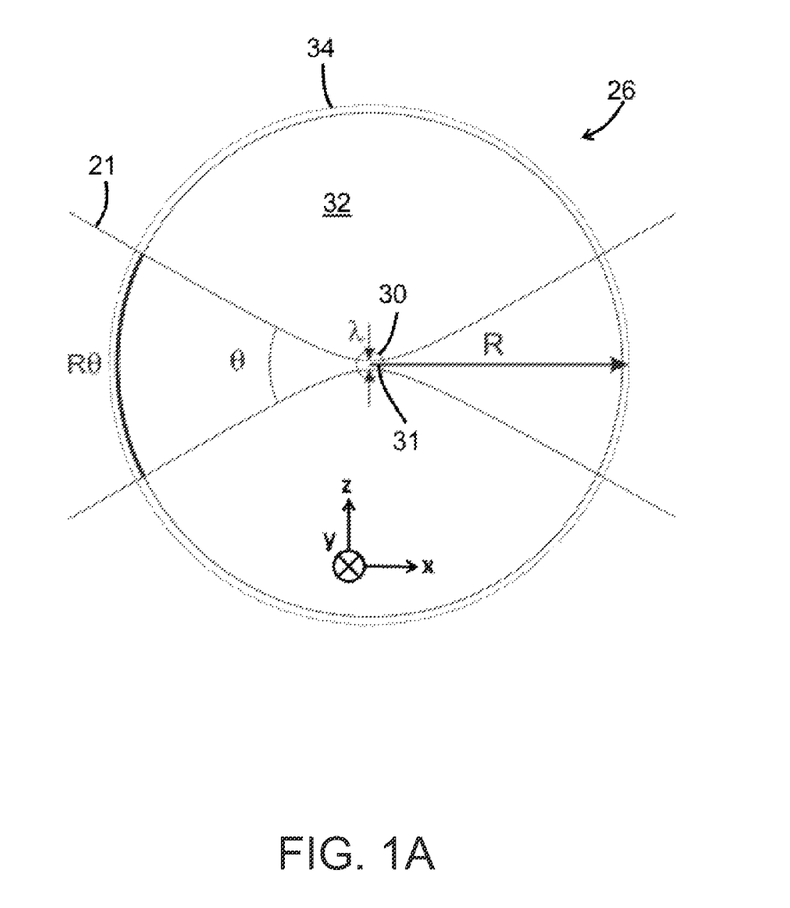
FIG. 1A is a cross-section view of the optical fiber shown in FIG. 1 during the writing process.
Figure 1B:
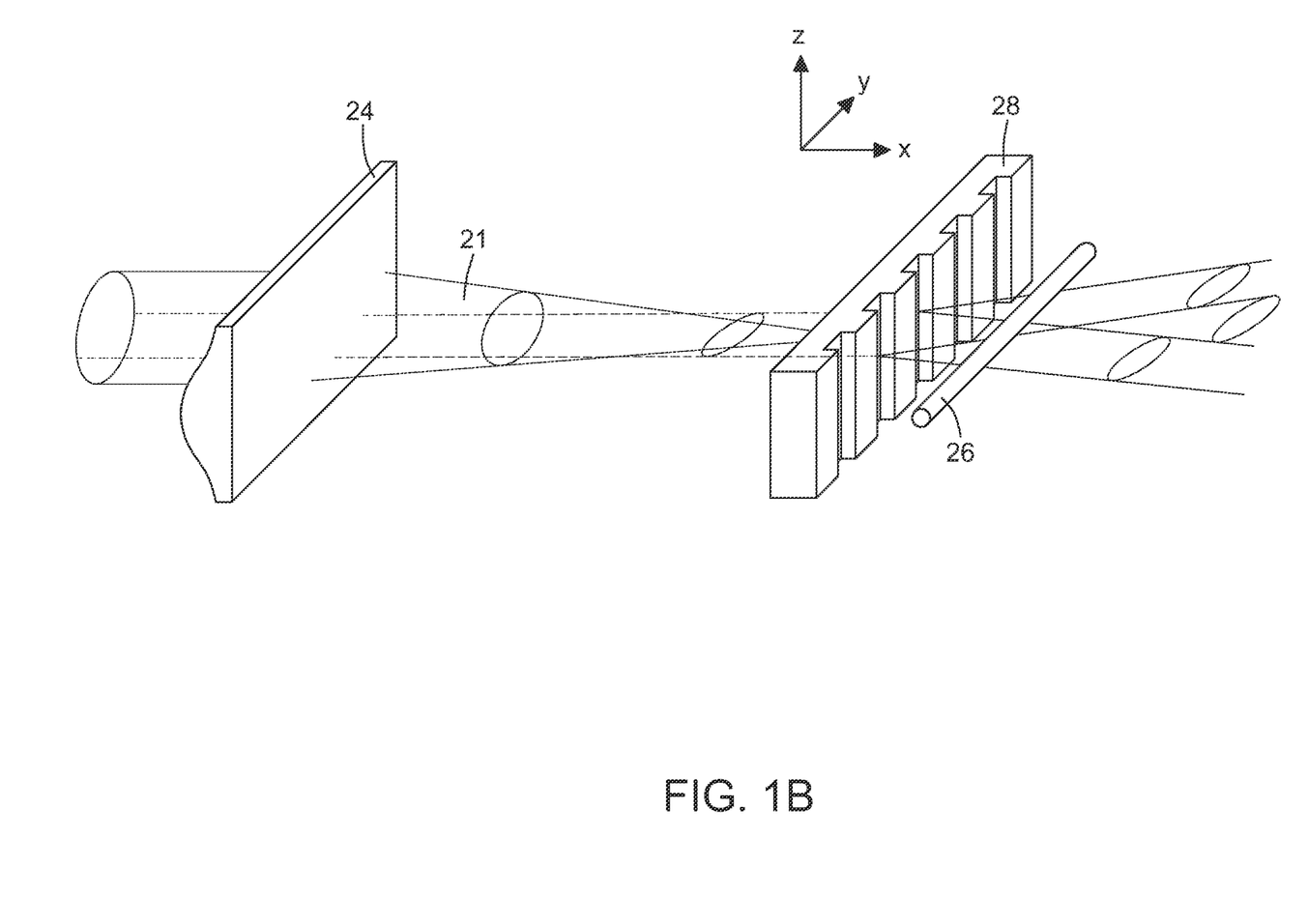
FIG. 1B is a side elevation view of a portion of the system of FIG. 1.

Preferably, the intensity of the optical pulses is below a damage threshold within the polymer coating, and above an FBG inscription threshold within the grating region of the fiber. It will be readily understood by one skilled in the art that a light beam of ultrafast pulses propagating through the polymer coating of an optical fiber is likely to affect the coating in a different manner depending on its intensity. If this intensity is kept low enough, then the integrity of the polymer coating will not be substantially compromised, and the mechanical strength of the optical fiber can remain unaffected by the WTC process. At very high light intensity values, the polymer coating can be ablated by the light beam. For intermediate values, if the intensity of the light beam in the polymer coating is equal to or above a damage threshold, then the optical pulses are likely to change and/or affect the chemical properties of the polymer material of the coating, in particular its light transmission properties. In practice, a blackening of the coating is observed, and can be directly linked to the weakening of the mechanical resistance of the fiber after the WTC process. By contrast, within the grating region itself the intensity of the light beam needs to be high enough to lead to a permanent refractive index change in the material through physical phenomena such as glass densification, the formation of color centers, the formation of voids or micro-structures, etc. Therefore, the FBG inscription threshold corresponds to the minimum light intensity within the grating region at which the desired transformation of the refractive index takes place. The basic principle of this light focusing is illustrated in FIG. 1A, where the optical fiber 26 is shown in cross-section. In the illustrated referential the X axis corresponds to the propagation direction of the light beam of optical pulses writing the Bragg grating, the Y axis (perpendicular to the plan of the page) corresponds to the longitudinal axis of the optical fiber 26, and the Z axis is therefore perpendicular to the direction of the light beam in the cross-sectional plane. The light beam 21 is focused on the grating region 31, here shown in the core 30 of the optical fiber 26, after passing through the polymer coating 34 and cladding 32. Examples of damage thresholds within the polymer coating and FBG inscription thresholds within the grating region of the fiber can be found in U.S. Pat. No. 10,132,994 (BERNIER et al), the entire contents of which being incorporated herein by reference.

In some implementations, the focusing of the light beam 21 of optical pulses is a result of the focusing geometry of the optical system 10 used to write the grating, typically defined by the configuration of the light generator 12, phase mask 28, optical fiber 26 and any other optical element acting on the optical pulses 21. In the embodiment of FIG. 1, an acylindrical focusing lens 24 is disposed in the path of the optical pulses upstream the phase mask 28. The profile of the acylindrical lens 24 may be selected in order to limit the spherical aberrations present when using short focal length cylindrical lenses, which causes a degradation of the focused beam quality. An acylindrical lens may provide the desired numerical aperture while preserving a sufficient quality of the light beam.

Figure 2:
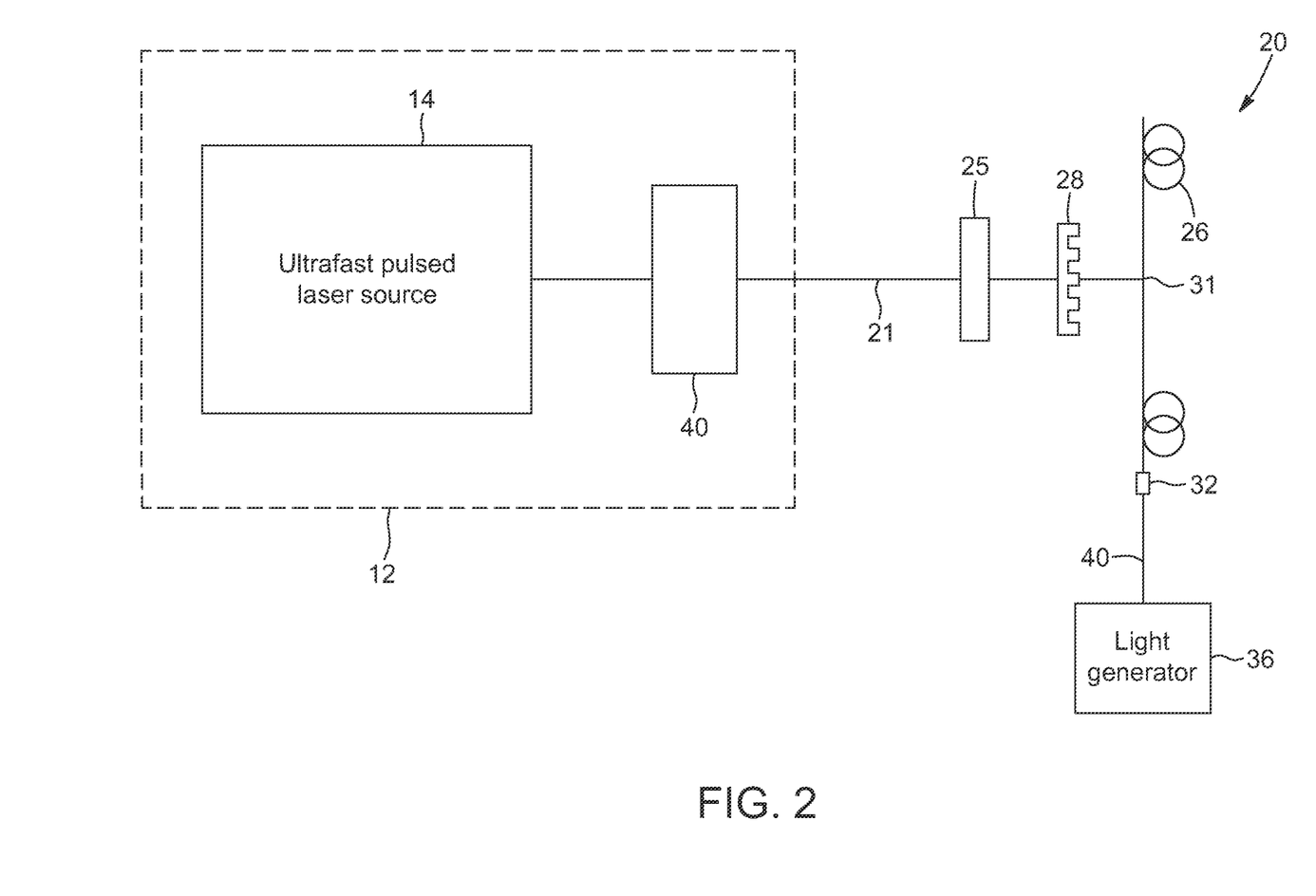
FIG. 2 is a schematic representation of a system for writing a Bragg grating in an optical fiber according to another embodiment, viewed along a length of the optical fiber.

Referring to FIG. 2, in another variant the system 20 includes a cylindrical lens 25 combined with a beam shaping component 40 pre-compensating the light beam for optical aberrations induced by the cylindrical lens 25, such as the spherical aberrations mentioned above. The beam shaping component 40 may be positioned at any appropriate location between the ultrafast pulsed light source 14 and the cylindrical lens 25. The beam shaping component preferably modifies the spatial profile of the light beam 21 such that the focusing of the light beam on the writing region is different, typically providing a higher intensity, than it would be using solely the cylindrical lens 25. The beam shaping component 40 may be embodied by a spatial pulse shaper adapted to affect the properties, namely the phase profile, of the light beam therethrough in the desired fashion. The spatial pulse shaper may for example be embodied by a combination of cylindrical and/or acylindrical lenses made of proper optical materials, graded index glass component, or a liquid crystal based device whose properties are adaptable through the application of a variable electrical field such as a spatial light modulator.

The present method further includes a step of photobleaching the Bragg grating by propagating a photobleaching light beam along the optical fiber. As explained in details below, the photobleaching light beam has optical parameters selected to reduce defects in the grating region induced by the writing of the Bragg grating, in a substantially non-thermal regime. The optical parameters may include one or more of a spectral profile, an exposure time and an intensity of the photobleaching light beam impinging on the grating region. In some implementations, the photobleaching of the Bragg grating is performed as a post-processing step after the writing of the Bragg grating. It will be readily understood that in other variants, the photobleaching of the Bragg grating may be performed concurrently to its writing without departing from the scope of protection.

Once the FBG has been inscribed in the optical fiber by the femtosecond pulses, the absorption of light by the fiber material in both the visible and near infrared range is increased. This phenomenon leads to light-induced losses of the light propagating in the fiber. Without suitable post-processing of the grating to reduce or eliminate these light-induced losses, propagation of high power light in the fiber, for example in the context of an FBG serving as a reflector of a laser cavity, may lead to absorption of the laser beam and excessive heating of the FBG in operation. Light-induced losses are typically present within a wide wavelength range, such that both pump and signal wavelengths are susceptible to increase absorption that causes heating of the FBG.

In addition, it is known in the art to age or anneal a FBG in order to ensure that the FBG optical parameters such as width, depth, or spectral profile will not change during its usable lifetime and normal use.

Traditional techniques for both annealing the grating and reducing the light-induced losses typically involve heating the FBG in an oven at a relatively high temperature, for example above 300° C., for a few minutes. While this approach has been found effective for stripped optical fibers, it is unsuitable in a WTC context, as acrylate-based or other types of polymer coatings would be likely damaged if exposed to heat sufficient to obtain the desired effects on the core of the fiber.

In accordance with one aspect, the photobleaching light beam is used for post-processing of the fiber and remove or reduce light-induced losses, at least partly, through nonthermal processes.

The reduction of light-induced losses in optical fibers is thought to result from the removal or significant reduction of glass defects in the fiber typically resulting from the grating writing process. Such glass defects may for example include color centers, internal stresses, etc.

Figure 3:
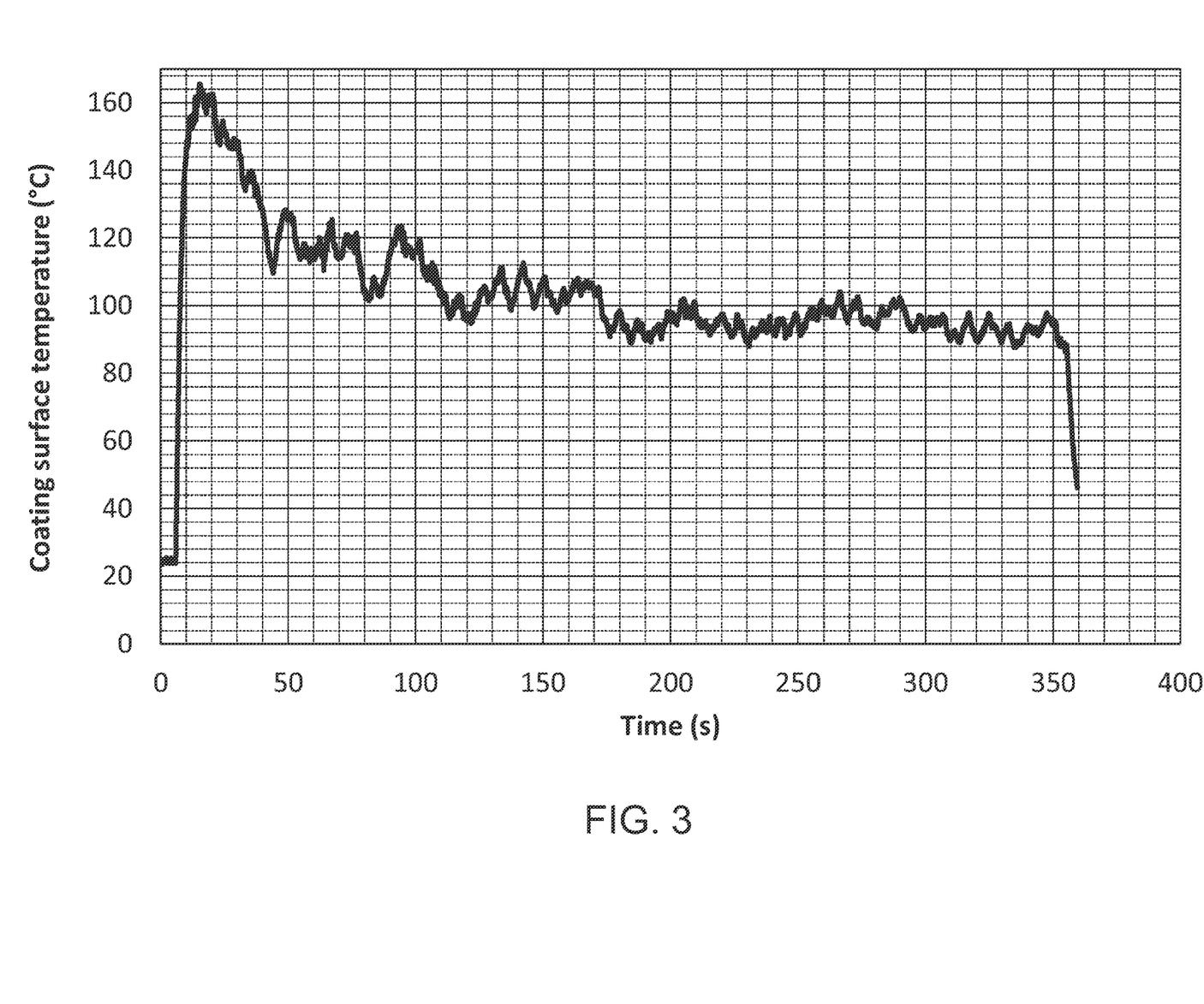
FIG. 3 is a graph showing the measured surface temperature of the fiber coating (over the FBG) during the photobleaching process (laser power of 8.5 W injected in the core of a 20/400 fiber).

In accordance with another aspect, the photobleaching light bream is operated in a substantially non-thermal regime, that is, the parameters of the photobleaching light beam are such that the temperature in the core of the fiber during interaction of the photobleaching light beam therewith is below a threshold at which thermal annealing takes place. By way of example, for typical optical fibers used for telecommunications or fiber lasers, thermal annealing according to purely thermal process requires temperature above 300° C. in the core for a few minutes. By contrast, it has been demonstrated by the inventors that a reduction of the glass defects in an optical fiber can be obtained from optical interactions of the photobleaching light beam with the fiber that are mostly nonthermal, that is, that are different from the absorption of light by the glass matrix of the fiber media and transformation of this light into heat. Finite element modeling revealed that when a fiber heated from its core is suspended in still air, the temperature of the optical fiber is almost uniform across its cross section, so that one can roughly estimate the temperature in the core of the fiber by measuring its surface temperature. The still air acts as an insulator. In tests performed by the inventors, measurement of the surface temperature of the fiber suspended in still air while photobleaching showed some increase in temperature, but far from the temperature above 300° C. typically required when using a pure thermal process to sufficiently reduce the propagation losses. Referring to FIG. 3, in one example of implementation, monitoring of the surface temperature of the fiber during photobleaching using a light beam of 8.5 W at 532 nm injected in the core of a passive 20/400 fiber showed a fiber surface temperature below 170° C. for 10 to 20 s and then below 120° C. for the remaining minutes. The fiber was held in still air during this process. Based on the previous assumption, the temperature of the core was barely above 170° C. for a few seconds and then below 120° C. Such low temperatures would not lead to significant reduction in light-induced losses if only a pure thermal process was involved.

Figure 4:
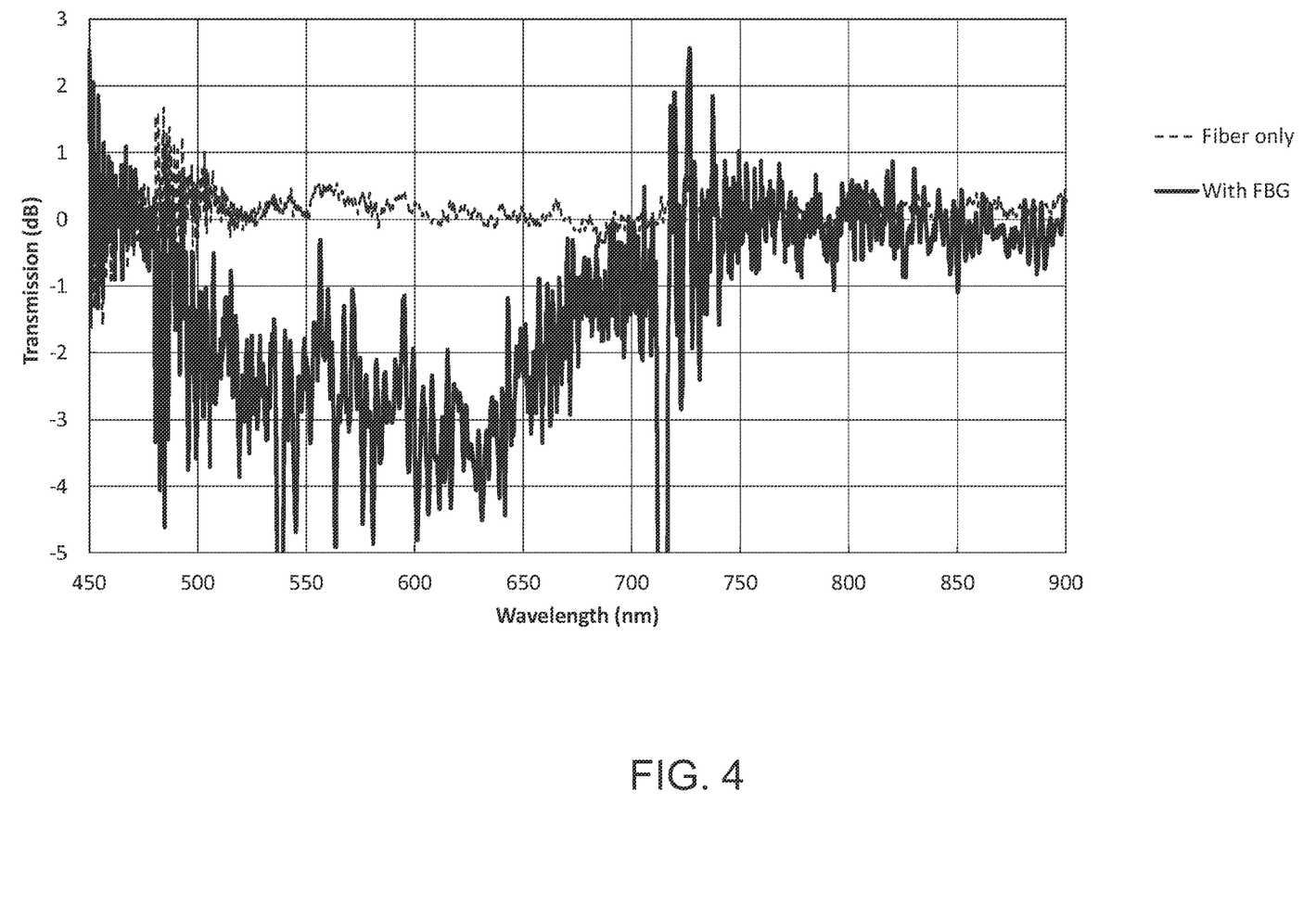
FIG. 4 is a graph respectively showing the transmission spectrum of an optical fiber prior to FBG inscription (broken line), and the transmission spectrum of a similar fiber following the ultrafast inscription step through the coating (full line).

In accordance to some implementations, the photobleaching light beam has a spectral profile composed of or including wavelengths within a non-thermal light absorption range of the optical fiber. Referring to FIG. 4, the curve in a broken line shows the transmission spectrum of an optical fiber prior to FBG inscription, and the curve in a full line illustrates the transmission spectrum of a similar fiber following the ultrafast inscription step through the coating (but prior to the photobleaching step of the present method). A dip between 450 and 700 nm can be observed, indicating increased light absorption at wavelengths within this range. Thus, in some embodiments, the photobleaching light beam is mainly composed of white light falling in that spectral band, that is, its spectral profile is within a wavelength range between about 400 nm and 700 nm. It is believed that light at any wavelength falling within that band would undergo at least partial absorption by the fiber matrix in a non-thermal regime, that is, the absorbed light results in an effective photobleaching of glass defects without generation of significant heat. In some variants, wavelengths close to the maximum absorption peak near 600 nm may be used. In other variants, use of a broadband source emitting light covering the full visible spectrum may be even more effective as it would cover a broader spectrum of defects of various energy levels.

The injected power of the photobleaching light beam may be selected in order to ensure that the absorption of light by the fiber is high enough to produce the desired photobleaching effect, while minimizing thermal effects. In some embodiments, the light generator may emit light of more than 500 mW. In some embodiments, the light generator may emit light of more than 1 W. In some implementations, the light generator is configured such that the photobleaching light beam impinging on the core of the optical fiber has an optical power between one Watt and 25 Watts. In some embodiments, a reflector could be used at the output of the fiber to reflect back the transmitted photobleaching light to increase the intensity in the core or to reduce the required injected power.

In some implementations, the photobleaching light source 36 may be in embodied by a CW laser source, a pulsed laser source or a non-laser source. As mentioned above, the light generator may emit light having a broadband spectrum such as supercontinuum sources, or a single wavelength in the visible range. By way of example, a solid state laser such as a 532 nm DPSS laser, a visible fiber laser or diode laser or high intensity LED may be used. By way of example, 10-25 W 532 nm green laser CW source such as the Spectra-Physics Millenia (trademark) or the Coherent Verdi (trademark) may be used. In some variants the light generator may include a plurality of light sources multiplexed such that the photobleaching light beam is a combination of their respective outputs.

The exposure time of the Bragg grating to the photobleaching light beam may depend on several factors. A period of 1 second to 500 hours may be sufficient and/or required depending on the available injected laser power and wavelength band. As an example, 1 hour at 6 W at 532 nm was shown to induce sufficient photobleaching. With a similar photobleaching light beam of 8.5 W the required time drops to about 10 minutes. In some implementations, operating the photobleaching light beam according to a sequence of different power levels over different time periods may be used, and may reduce the overall photobleaching time while keeping the fiber temperature low enough to avoid damage to the coating.

It will be readily understood by one skilled in the art that a variety of optical configurations may be used in order to carry out the post processing step described herein. Referring to FIG. 1, in one example the optical system 10 may include a light input 32 at one extremity of the optical fiber 26 and a light source 36 generating the photobleaching light beam 40 and optically coupled to the light input 32. The photobleaching light beam may be coupled into the core of the optical fiber and to be guided therealong the fiber according to any suitable technique, such as passive or active alignment.

In some embodiments, the optical fiber is suspended in air during the post-processing step. Under such circumstances, the temperature throughout the core, cladding, and polymer coating of the fiber is believed to be fairly spatially uniform. In such embodiments the power of the photobleaching light beam should be low enough to ensure that the polymer coating is not damaged by diffusing heat. In other implementations, the optical fiber may be heat sinked during the post-processing step, which may advantageously provide a temperature gradient between the core of the optical fiber and the polymer coating. As such, in some variants the power of the photobleaching light beam may be selected to be high enough to provide some measure of heating of the FBG above room temperature, while remaining below the value at which heating of the polymer coating through thermal diffusion and/or optical losses from the core would induce damage is to the coating. A combination of nonthermal and thermal effects can then be used to remove color centers from the core of the optical fiber.

In some implementations, the propagation of the photobleaching light beam as explained above also has the effect of annealing or aging the grating. It has been demonstrated by the inventors that a same beam of visible light, when used at the appropriate power and duration, can both erase the defects or age the grating. This is observed by measuring the optical properties of the FBG, namely its reflectivity, central wavelength and bandwidth. In particular, the inventors observed that the FBG reflectivity is decreased following the propagation of the photobleaching light beam. This is reminiscent of the thermal annealing process, where a similar behaviour is observed. It is believed that the less stable defects are being removed or erased and that the defects that remain are more stable and would produce little or no change to the FBG properties important for fiber laser operations. The inventors have also confirmed the stability of the FBG after photobleaching by an additional thermal annealing, and observed that the decay was sufficiently stable to indicate that the FBG would be stable for its lifetime of normal usage.

In some embodiments, the method described above may be useful even in cases where a Bragg grating is written in an optical fiber that has been stripped of its polymer coating and thermally annealed at temperatures above the annealing threshold. In some implementations, photobleaching can contribute to reducing defects more efficiently than using thermal processing alone.

Of course, multiple modifications could be made to the embodiments described above without departing from the scope of protection.

The invention claimed is:

1. A method for providing a low absorption Bragg grating along a grating region of an optical fiber, comprising:
   a) writing the Bragg grating along the grating region by multiphoton absorption of ultrafast light pulses impinged on said grating region, said ultrafast light pulses also inducing defects in the grating region; and
   b) photobleaching the Bragg grating by propagating a photobleaching light beam along the optical fiber for a sequence of time periods each associated with a different optical power level, the photobleaching light beam interacting with the grating region so as to reduce the defects induced by the ultrafast light pulses in a substantially non-thermal regime.

2. The method of claim 1, wherein a temperature in the grating region of the fiber during interaction of the photobleaching light beam therewith is below a thermal annealing threshold.

3. The method according to claim 1, wherein the photobleaching light beam has a spectral profile including wavelengths within a non-thermal light absorption range of the optical fiber.

4. The method according to claim 3, wherein the spectral profile of the photobleaching light beam is composed of said wavelengths within a non-thermal light absorption range of the optical fiber.

5. The method according to claim 3, wherein said non-thermal light absorption range consists of a wavelength range between about 400 nm and 700 nm.

6. The method according to claim 3, wherein the spectral profile of the photobleaching light beam comprises wavelengths around 600 nm.

7. The method according to claim 1, wherein the photobleaching light beam has an optical power within the grating region between about 1 W and 25 W.

8. The method according to claim 1, wherein the propagating of the photobleaching light beam in the optical fiber is performed for an exposure time between 1 second and 500 hours.

9. The method according to claim 1, wherein the photobleaching of the Bragg grating is performed subsequently to the writing of the Bragg grating.

10. The method according to claim 1, wherein the photobleaching of the Bragg grating is performed concurrently to the writing of the Bragg grating.

11. The method according to claim 1, wherein the writing of Bragg grating is performed through a polymer coating of the optical fiber.

12. The method according to claim 1, further comprising thermally annealing the Bragg grating prior to said photobleaching thereof.

13. The method according to claim 1, further comprising maintaining the optical fiber suspended in air during the photobleaching of the Bragg grating.

* * * * *